United States Patent [19]
Ofek

[11] Patent Number: 5,896,548
[45] Date of Patent: Apr. 20, 1999

[54] DATA TRANSFERRING SYSTEM HAVING FOREGROUND AND BACKGROUND MODES AND UPON DETECTING SIGNIFICANT PATTERN OF ACCESS IN FOREGROUND MODE TO CHANGE BACKGROUND MODE CONTROL PARAMETERS

[75] Inventor: Yuval Ofek, Framingham, Mass.

[73] Assignee: EMC Corporation, Hopkinton, Mass.

[21] Appl. No.: 08/807,452

[22] Filed: Feb. 28, 1997

Related U.S. Application Data

[63] Continuation-in-part of application No. 08/522,903, Sep. 1, 1995, Pat. No. 5,680,640.

[51] Int. Cl.[6] .................................................. G06F 13/10
[52] U.S. Cl. ........................ 395/840; 395/834; 395/853
[58] Field of Search .................................... 711/114, 117; 395/182.05, 595, 823

[56] References Cited

U.S. PATENT DOCUMENTS

| | | | |
|---|---|---|---|
| 4,371,927 | 2/1983 | Wilhite et al. | 364/200 |
| 4,980,823 | 12/1990 | Liu | 364/200 |
| 5,146,578 | 9/1992 | Zangenehpour | 395/425 |
| 5,293,609 | 3/1994 | Shih et al. | 395/425 |
| 5,530,941 | 6/1996 | Weisser et al. | 395/478 |
| 5,537,566 | 7/1996 | Konno et al. | 711/114 |
| 5,619,723 | 4/1997 | Jones et al. | 395/823 |
| 5,657,486 | 8/1997 | Czamara et al. | 395/595 |
| 5,751,937 | 5/1998 | Arai et al. | 395/182.05 |
| 5,765,189 | 6/1998 | Treiber et al. | 711/117 |

*Primary Examiner*—Thomas C. Lee
*Assistant Examiner*—Chien Yuan
*Attorney, Agent, or Firm*—Pearson & Pearson

[57] ABSTRACT

A method and apparatus for transferring data from a donor storage device to a target storage device in parallel with requests from a host computer for transfers between the host computer and the target storage device. A copy subroutine operates in response to background and foreground mode controllers. The background mode controller normally copies data from an initial position in the donor storage device sequentially by data block. When a DTR command from the host processor requests a data element from a block that has not migrated to the target storage device, the foreground controller uses the copy subroutine to transfer the designated block. The storage areas are divided into statistical blocks. If a threshold number of consecutive DTR commands accesses a particular statistical block, the system resets the parameters for the background mode controller to effectively move the copy subroutine to begin background copying from the statistical block. A subsequent request to move the subroutine in the background mode cannot occur until a minimum number of data blocks have been transferred.

34 Claims, 6 Drawing Sheets

DATA TRANSFERRING SYSTEM HAVING FOREGROUND AND BACKGROUND MODES AND UPON DETECTING SIGNIFICANT PATTERN OF ACCESS IN FOREGROUND MODE TO CHANGE BACKGROUND MODE CONTROL PARAMETERS

CROSS REFERENCE TO RELATED APPLICATION

This application is a continuation-in-part of patent application Ser. No. 08/522,903, now U.S. Pat. No. 5,680,640, filed Sep. 1, 1995 by Yuval Ofek and Moshe Yanai for a System and Method for On-Line, Real Time, Data Migration which application is assigned to the same assignee as this application and is incorporated herein by reference.

BACKGROUND OF THE INVENTION

1. Field of the Invention

This invention relates to data storage systems including systems and methods for the on-line replacement of an existing data storage system. More particularly this invention relates to a system and method for transferring data from one disk storage sub-system to another.

2. Description of Related Art

Data processing centers of businesses and organizations such as banks, airlines and insurance companies, rely almost exclusively on their ability to access and process large amounts of data stored on a data storage system or device, typically a disk array storage device. Data and other information which is typically stored on one or more data storage devices which form part of a larger data storage system is commonly referred to as a database.

Databases are nearly always "open" and constantly "in use" and being accessed by a coupled data processing system, i.e., a central processing unit (CPU) or host mainframe computer. The inability to access data is disastrous if not a crisis for such business and organizations and will typically result in the business or organization being forced to temporarily cease operation.

During the course of normal operations, these businesses and organizations must upgrade their data storage devices and data storage systems. Although such upgrading sometimes includes only the addition of data storage capacity to their existing physical systems, more often than not upgrading requires the addition of a completely separate and new data storage system. In such cases, the existing data on the existing data storage system or device must be backed up on a separate device such as a tape drive, the new system installed and connected to the data processing unit, and the data copied from the back-up device to the new data storage system. Such activity typically takes at least two days to accomplish. If the conversion takes more than two days or if the business or organization cannot withstand two days of inoperability, the need and desire to upgrade their data storage system may pose an insurmountable problem.

Some prior art data copying methods and systems have proposed allowing two data storage systems of the same type, a first system and a second system, to be coupled to one another, and allowing the data storage systems themselves to control data copying from the first to the second system without intervention from or interference with the host data processing system. See for example, the data storage system described in U.S. Pat. No. 5,544,347 issued Aug. 6, 1996 entitled DATA STORAGE SYSTEM CONTROLLED REMOTE DATA MIRRORING WITH RESPECTIVELY MAINTAINED DATA INDICES, fully incorporated herein by reference, which describes one such remote data copying facility feature which can be implemented on a Symmetrix 5500 data storage system available from EMC Corporation, Hopkinton, Mass.

Although such a system and method for data copying is possible, in most instances, the first and second data storage systems are not of the same type, or of a type which allow a "background" data migration to take place between the two data storage systems, unassisted by the host and while the database is open. Additionally, even on such prior art data storage systems, migrating data as a "background" task while the database is "open" does not take into account the fact that the data is constantly changing as it is accessed by the host or central processing unit and accordingly, if the old system is left connected to the host, there will always be a disparity between the data which is stored on the old data storage system and the data which has been migrated onto the new data storage system. In such cases, the new data storage system may never fully "catch up" and be able to be completely synchronized to the old data storage system.

Co-pending U.S. patent application Ser. No. 08/522,903 depicts a system and method for migrating data from a first or a donor data storage device or sub-system to a second or target data storage device or sub-system. As described more fully therein, the target data storage device replaces the donor disk storage device and has the same general configuration as the donor storage device, albeit generally with a greater capacity. Connections are established among a host computer system and the donor and target storage devices so that data transfer requests from the host processor are handled by the target storage device. A copy subroutine, normally controlled to operate in a background mode, transfers sequential blocks of data elements, by track in the specifically disclosed embodiment, from the donor to the target storage device. The target storage device also responds to data transfer requests, such as read and write commands, that identify locations for particular data elements in one or more sequential locations. When this occurs the copy subroutine switches to a primary or foreground mode to make the requested transfer of a track or block containing the data elements from the donor to the target storage device assuming that the data element is not already present in the target storage device.

As an alternative, the migration process may determine that one or more read requests from the host 12 are part of a sequence of such read requests. In such an instance, a channel process may take the current address of data being requested by the host processor and increase it by a predetermined number. For example, if the host processor were currently requesting data from an address '411', the channel process could issue a read request to the donor storage device for the data at address '411'. Generally simultaneously the channel process will pass an indication to begin prefetching data from the next successive address so that the target storage device "gets ahead" of the channel process in the actual data requests from the donor storage device.

This general concept of prefetching or otherwise optimizing the transfer of data from one data storage facility to another has also been disclosed in a number of other patents including:

| | | |
|---|---|---|
| 4,371,927 | (1983) | Wilhite et al. |
| 4,980,823 | (1990) | Liu |

-continued

| 5,146,578 | (1992) | Zangenehpour |
| 5,293,679 | (1994) | Shih et al. |
| 5,530,941 | (1996) | Weisser et al. |

United States Letters U.S. Pat. No. 4,371,927 discloses a data processing system including a cache store to provide an interface with a main storage unit for a central processing unit. The central processing unit includes a microprogram control unit in addition to control circuits for establishing the sequencing of the processing unit during the execution of program instructions. Both the microprogram control unit and control circuits include means for generating pre-read commands to the cache store in conjunction with normal processing operations during the processing of certain types of instructions. In response to pre-read commands, the cache store, during predetermined points of the processing of each such instruction, fetches information which is required by such an instruction at a later point in the processing thereof. It is the object of the execution of pre-read commands to provide a prefetch capability suitable for use in either a high speed processing system or a multiprocessing environment.

United States Letters U.S. Pat. No. 4,980,823 discloses a method and apparatus for sequentially prefetching data with deconfirmation. Specifically, a computer memory management method for cache memory uses a deconfirmation technique to provide a simple sequential prefetching algorithm. Access sequentially is predicted based on simple histories. Each memory line in cache memory is associated with a bit in an S-vector, which is called the S-bit for the line. When the S-bit is on, sequentiality is predicted meaning that the sequentially next line is regarded as a good candidate for prefetching, if that line is not already in the cache memory. The key to the operation of the memory management method is the manipulation (turning on and off) the S-bits. It is the object of this methodology to provide a technique that will substantially reduce cache misses and prefetch with high accuracy based upon simple histories.

United States Letters U.S. Pat. No. 5,146,578 discloses a method of varying the amount of data prefetched to a cache memory in dependence on the history of data requests. If the previous fetch and current fetch requests are not sequential no data is prefetched. If the previous fetch and current fetch request are sequential and less than all of the current fetch request is already in the cache, two blocks of data sequentially beyond the current fetch request are prefetched. If the previous two blocks fetched and current fetch request are sequential and less than all of the current fetch request is already in the cache, four blocks of data sequentially beyond the current fetch request are prefetched. If the previous three blocks fetched and the current fetch request are sequential and less than all of the current fetch request is already in the cache, eight blocks of data sequentially beyond the current fetch request are preferred. The prefetch algorithm is limited at eight blocks. Each additional sequential request, when less than all of specified data is already in the cache, will cause eight blocks to be prefetched. The object of this methodology is to sequentially prefetch data only when it is advantageous to perform such prefetching based upon past history and to provide a methodology by which the amount of data which is prefetched can be altered.

United States Letters U.S. Pat. No. 5,293,609 discloses a method for a hit density based replacement for a data cache with prefetching. A least recently used cache replacement system includes a data cache that is logically partitioned into two separate sections, demand and prefetch. A cache directory table and a least recently used table are used to maintain the cache. When a new demand data page is added to the cache, a most recently used (MRU) pointer is updated and points to this new page. When a prefetch page is added to the cache, the least recently used pointer of the demand section is updated with its backward pointer pointing to this new page. A cache hit on a demand of prefetch page moves that page to the top of the least recently used table. When a free page is needed in the cache, it is selected from the demand or prefetch sections of the memory based on a comparison of the demand hit density and the prefetch hit density so to maintain a balance between these two hit densities. It is the objective of this system to provide a cache management data system that automatically adjusts the size of the storage areas of cache allocated for demand and prefetch data to balance allocated areas on the basis of area performance during operation.

United States Letters U.S. Pat. No. 5,530,941 discloses a system and method for prefetching data from a main computer memory into a cache memory. The main and cache memories are accessible by a host processor and other bus masters connected thereto by a bus. Code data elements to be read by the host processor are predicted. The predicted code data elements are then transferred from the main memory to cache memory without delaying memory access requests for data from the other bus masters. The objectives of this system are to improve the response time of a memory system by prefetching.

The foregoing prior art utilizes one of two basic approaches either singularly or in combination. In one approach, the system is adapted for operating under a set of conditions in which it is presumed that any requests for data from a host processor system will be random in nature. In the other it is assumed that the requests will access locations sequentially. Some combine the two. However, in those systems described in the cited patents, the methods are applied to transfers to a cache memory. In such applications only small amounts of memory are involved. Performance in such systems will degrade if a large amount of data needs to be transferred. In each patent the methodology is involved with the processing aspect of data system operation that involves the actual manipulation of data. Nothing in these patents discloses on-line transactions when data is being manipulated with the parallel migration of data from a donor storage device to a target storage device. Responses to host processor data transfer requests can slow, even with the system disclosed in the copending application, to a level where the data migration is no longer transparent and on-line performance is affected.

SUMMARY

It is an object of this invention to provide an improved method and system for transferring data between two data storage devices.

Another object of this invention is to provide an improved method and system for implementing the migration of data from a donor storage device to a target storage device.

Another object of this invention is to provide an improved method and system for migrating data in parallel with on-line operations that adapt to different conditions.

Still another object of this invention is to provide a method and system for transferring data from a donor to a target storage device with maximum efficiency.

In accordance with this invention, data elements transfer from a first to a second data storage device, like a disk storage system, by copying the data in sequence and nonredundantly from a defined starting location and by responding to data transfer requests that can occur during the copying process. In addition the data is organized into localized areas corresponding to a predetermined number of consecutive storage locations. The method includes initializing a defined starting location whereby the background copying begins to transfer data from that location in a sequential manner. Each time a data transfer request is received and requires a transfer, a determination is made concerning the activity within a localized area relative to a particular threshold. If the activity is not significant, only the requested data is transferred. If it is significant, the operating parameters for a copy subroutine are set to a starting location at the localized area thereby to switch the site of the copy subroutine to initiate transfers from the new location.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

The present invention is particularly adapted for use with a system and method for providing on-line, real-time, transparent data migration between two data storage systems, at least one of which is coupled to a data processing device, such as one or more host computers.

Figure 1:
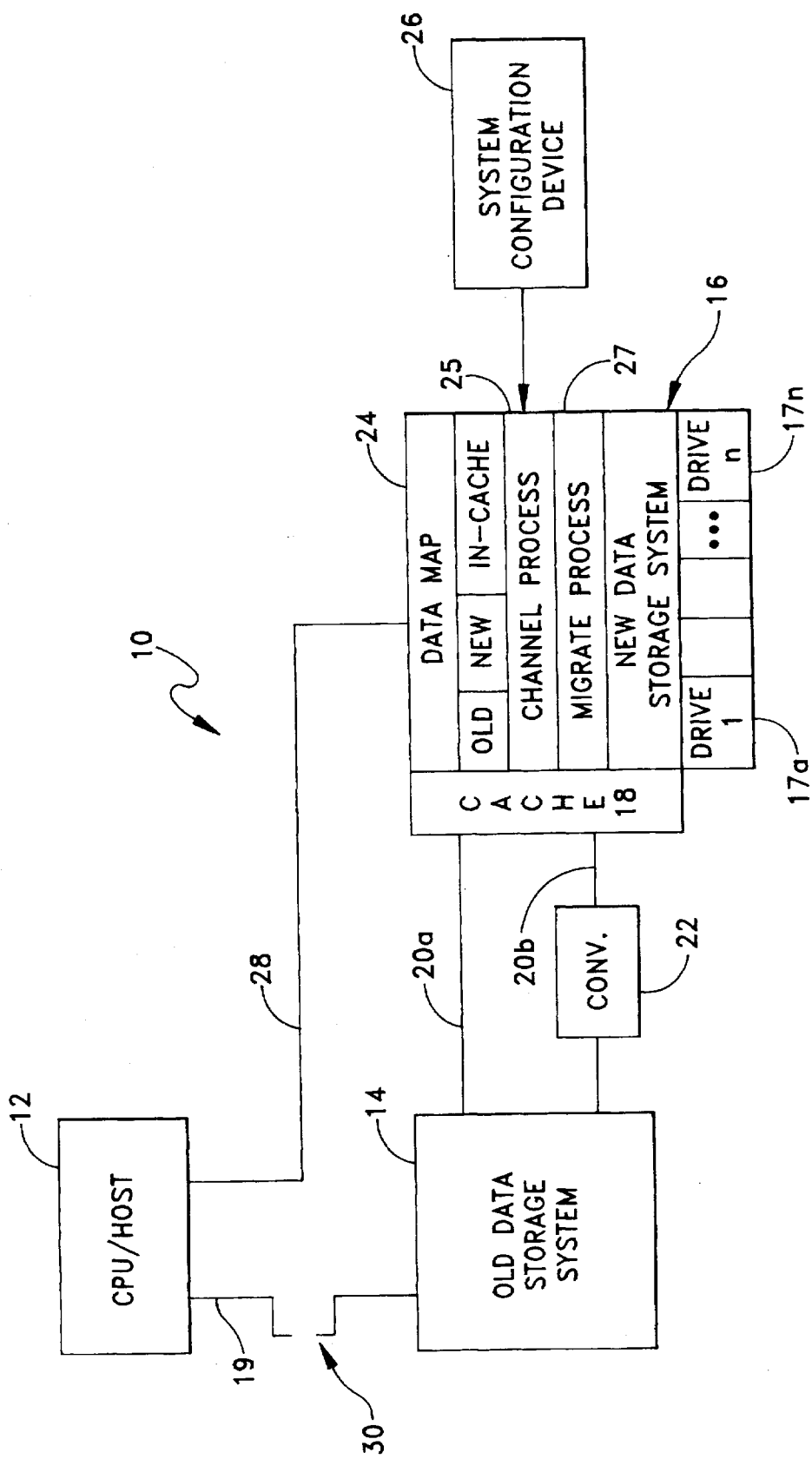
FIG. 1 is a schematic diagram of an exemplary data processing system including a host processor, first and second disk storage sub-systems in which an on-line, data transparent data migration will occur between the first and second disk storage sub-systems.

An exemplary system 10, FIG. 1 on which the present invention may be performed and implemented includes a host computer, central processing unit or other similar data processing device 12. The data processing device 12 is initially coupled to a first data storage system 14. In most instances, the first data storage system 14 is an older data storage system which is either not large enough to handle the needs of the data processing device 12, or for some other reason is going to be completely or partially replaced or augmented by the addition of a second data storage system 16.

The first data storage system 14 is initially coupled to the data processing device 12 by means of a data communication link 19. The second data storage system 16 is coupled to the first data storage system 14 by means of one or more data communication paths 20a, and/or 20b. Examples of data communication paths 20a–20b include an IBM "bus and tag" connection well known to those skilled in the art, and higher speed fiber optic connections, such as ESCON data connections.

If the first and second data storage systems 14, 16 have an incompatible data communication protocol or interface, a protocol converter 22 may be provided on one or more of the data communication links 20a, 20b as required, and as is well known in the art.

The second data storage system 16 includes a data map or table 24 of data elements which are stored on at least the second data storage system 16. The data map or table is established during the set-up or configuration of the second data storage system 16 and is dependent on the particular configuration of the second data storage system 16.

Preferably, the data map/table 24 also includes information about data elements which are stored in the first data storage system 14, the use of such a data map/table will be explained in greater detail below.

The second data storage system 16 is typically and preferably coupled to a data storage system configuration device 26, such as a computer, which allows the user to configure the second data storage system 16 and the data map/table 24 as desired by the user. In the preferred embodiment the second data storage system 16 is at least partially configured exactly as the first data storage system 14 is configured in terms of the number of logical devices, storage size, storage system type (3380/3390, for example) etc.

In the preferred embodiment, the data storage system configuration device 26 allows the user to configure at least a portion of the data storage area on second data storage system 16 to include data element storage locations or addresses which correspond to data element storage addresses on the first data storage system 14.

In the preferred embodiment, the second data storage system 16 is a disk drive data storage system employing a large number of fixed block architecture (FBA) formatted disk drives 17a–17n, and adapted for storing large amounts of data to be accessed by a host computer or other data processing device 12. The exemplary second data storage system 16 also typically includes a cache memory 18 which serves to hold or buffer data read and write requests between the second data storage system 16 and the host or other data processing device 12. Such data storage systems are well known to those skilled in the art and include, for example, the Symmetrix 5500 series data storage system available from EMC Corporation, Hopkinton, Mass.

Initially, the second or new data storage system 16 is first coupled to the first data storage system 14 by means of one or more data communication links or paths 20a, 20b. After the second data storage system 16 has been configured using a system configuration device 26 or other similar or equivalent device, or by the host 12, the second data storage system 16 is coupled to the host computer 12 or other data processing device by means of a data communication path 28.

Preferably, data communication path 28 is a high speed communication path such as a fiber optic "ESCON" communication path, although any and all other communication paths are considered to be within the scope of the present invention. Immediately before connecting data communication path 28 between the host or other data processing unit 12 in the second data storage system 16, the previously existing data communication path 18 between the host 12 and the first data storage system 14 is disconnected or severed as illustrated at arrow 30.

Thus, in contrast with the prior art whereby the host or other data processing system 12 must be taken off line for a number of days in order to allow for backing up of data on the first data storage system 14 followed by the replacement of the first data storage system 14 with a second data storage system 16 and subsequent copying of all of the data onto the new data storage system 16, or a host which remains coupled to the original 'first' data storage system 14, the present invention only requires the host computer or other data processing device 12 to be off line or service interrupted for a relatively short period of time (the procedure typically takes approximately 10 minutes or less), while the first data signal path 19 is severed or disconnected and the second data signal path 28 is established between the second or new data storage system 16 and the host computer or other data processing device 12.

Accordingly, after the second data storage system 16 has been connected to the host or other data processing unit 12, whenever the host or data processing unit 12 issues a request to read data from or write data to "its" data storage system, the request is received by the second data storage system 16. Using a bit or flag from the data map/table 24 previously established and configured, the second data storage system 16, by scanning data map/table 24, determines whether or not the data requested (in the case of a read operation) is stored on the first data storage system 14 or on the second data storage system 16.

Such a hierarchical data map/table 24 is further explained and exemplified herein as well as in U.S. Pat. Nos. 5,206,939 and 5,381,539 assigned to the assignee of the present invention and both fully incorporated herein by reference.

If the data is already stored in the second data storage system 16, the second data storage 16 retrieves the data (perhaps temporarily storing the data in cache memory 18) as is well known in the art, and makes the data available to the host or other requesting data processing device 12.

If the requested data is not on the second data storage system 16, channel or real-time data handling process 25 of the second data storage system 16 issues a read data request to the first data storage system 14 in the manner and format native or known to the first data storage system 14 (for example, standard IBM data read commands). Channel or real-time data handling process 25 is, in the preferred embodiment, a software program comprising a series of commands or instructions which receives one or more commands from the second data storage system interface to the host or CPU (typically called a "channel"), interprets those commands, and issues one or more corresponding commands which can be acted upon by the first data storage system. Such an 'interpreter' type of software is well known to those skilled in the art.

The first data storage system 14 then retrieves the requested data and provides it to the second data storage system 16. The second data storage system 16 then makes the data available to the host or other data processing unit 12 which has requested the data.

Since the second data storage system now has a copy of the data, the data will be written to the second data storage system 16 and the appropriate data map/table 24 flags or bits updated to indicate that the data has been migrated to the second data storage system 16 so that next time the same data element is requested, the second data storage system 16 will have the data already stored on the system and will not have to request it from the first data storage system.

Further, as will be explained in greater detail below, the second data storage system 16 can perform a "background" data migration procedure or process 27. The "background" data migration procedure of process 27 is, in the preferred embodiment, a software program including a series on instructions which coordinate, monitor and control data migration whereby whenever the second data storage system is not busy handling data input/output requests from the host or other data processing device 12, the migrate process 27 of the second data storage system 16 determines which data on the first data storage system has not been copied by reading a specified flag or bit in its data table/map 24, and copies or "migrates" the data from the first data storage system 14 to the second data storage system 16 completely transparent to the host 12, and often in parallel with the channel process 25 which may be retrieving data from the first data storage system 14 in response to requests from the host or CPU 12, while maintaining full accessibility to the data by the host or other data processing device 12.

Figure 2:
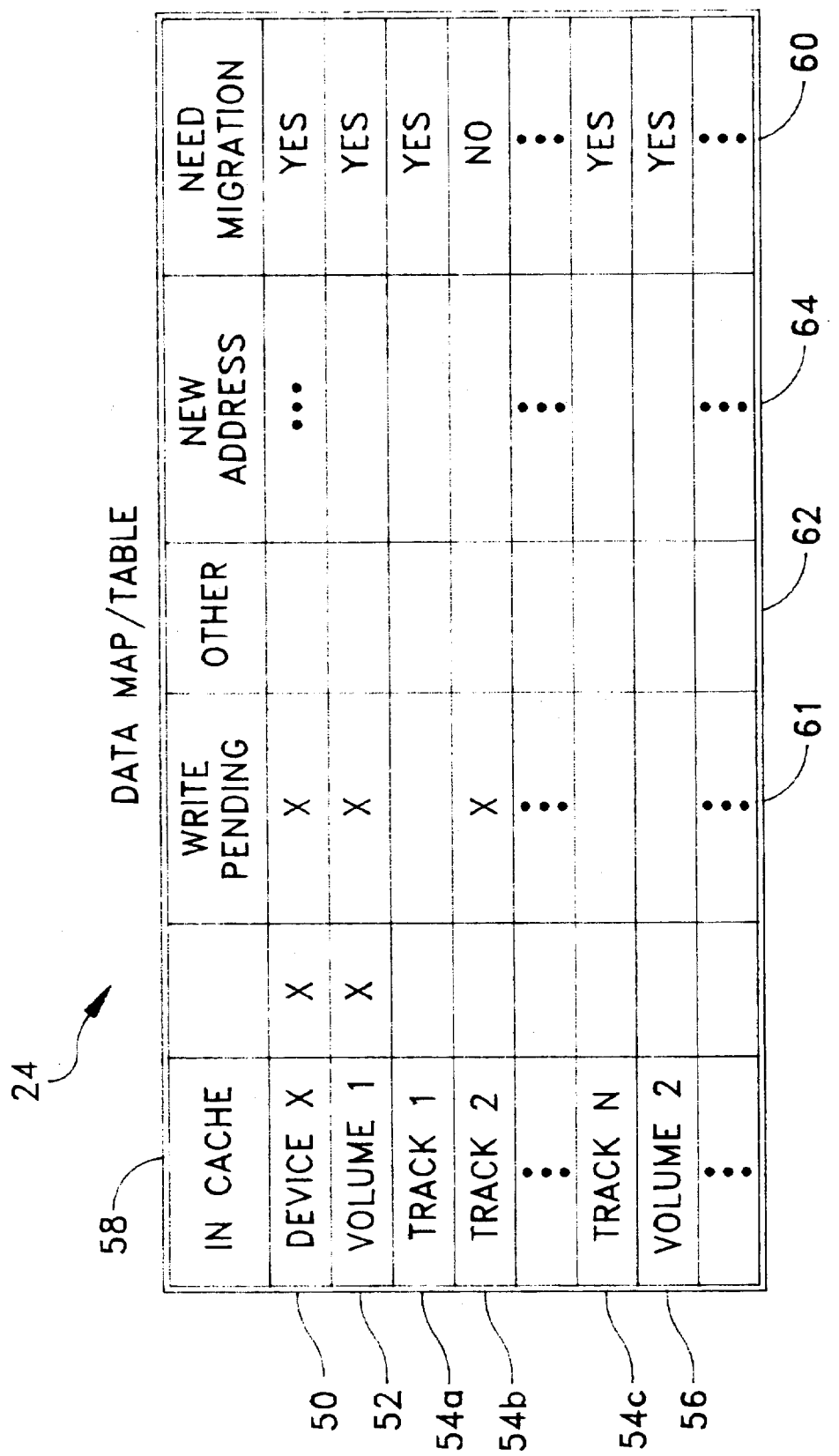
FIG. 2 is a schematic illustration of a data element map or table useful in the operation of the system shown in FIG. 1.

An exemplary data element map/table 24 is shown in greater detail in FIG. 2. In the preferred embodiment, the data map/table 24 is organized in a hierarchical fashion. For example, for the preferred embodiment wherein the data storage system includes a plurality of longer term data storage devices such as disk drives 17a–17n, and wherein each disk drive is partitioned into one or more logical "volumes" and each volume comprises a number of disk drive tracks, the data map/table 24 will first have an entry 50 for each physical and/or logical device such as a disk drive.

The device entry 50 will be followed by an entry 52 for a first logical volume, followed by one or more entries 54a–54c for each track of the device which comprises the logical volume 52. The entries 52, 54a–54c for the first logical will be followed by entry line 56 for the second logical volume configured on the physical device indicated by the entry at line 50.

All information about the data storage system and each device in the data storage system with the exception of the "data in cache" indication flag or bit 58 is stored in hierarchical format in the data map/table 24. Thus, whenever the second data storage system 16 desires or needs to obtain information about a particular data element (be it an individual data record, track or volume), the data storage system 16 scans the data map/table 24 beginning at the device level 50 to determine whether or not the desired criterion or characteristic has been established for any track or volume of a device.

There will be a 'flag' or other similar indicator bit set, or other indication of the desired characteristic in the device entry 50, in the volume entry 52 and in the appropriate track entry 54 if the desired characteristic is found in that portion of the data storage device represented by the data map/table 24.

For example, the preferred embodiment of a data map/table 24 includes a write pending flag or bit 61 which is set if a particular data element is presently stored in cache 18 of the second data storage system 16 and must be written to longer term storage such as a disk drive 17a–17n. For exemplary purposes, assuming that track 2 of volume 1 is in cache 18 in the second data storage system 16 and write pending, the write pending flag or bit 61 and the in cache bit 58 at line entry 54b (for track two) will be set, as will the write pending bit 61 of volume 1 at line 52 of the data map/table 24, as will the write pending bit 61 of the device at line 50.

Thus, if the second data storage system 16 wishes to determine whether or not a particular track or record which has been requested is write-pending or has been migrated to the second system or of the status of some other attribute or characteristic, the data storage system 16 first determines which device or disk drive 17a–17n the data element is stored on and then checks the appropriate indicator flag bit for that device. If the particular indicator flag bit is not set for that device, then the second data storage system 16 knows immediately that no lower level storage unit or location such as a volume or track in that device has that attribute. If any lower data storage element in the hierarchical structure such as a track or volume includes the attribute, than the attribute or flag bit for the device will be set.

Similarly, if a particular data storage location such as a record or track which is part of a logical volume has the requested attribute, then the corresponding attribute or flag bit for the volume will be set. The data storage system 16 can thereby quickly determine whether any data storage location having a lower level than the volume or other similar logical or physical partition being examined has the particular attribute, without scanning or searching each and every lower level data storage location.

The "in-cache" flag or bit is an exception to the hierarchical structure in that since each line or entry 50–56 of the data map/table 24 is directly addressable, the second data storage system directly addresses the table entry line for a particular data element when it must inquire or "look-up" whether that particular data element is presently "in-cache". It is understood, however, that this flag or bit could be managed in a hierarchical fashion without departing from the scope of this invention.

In addition to the in-cache bit or flag 58 and the write pending flag or bit 61, the data map/table 24 which is one feature of the present invention includes, in the preferred embodiment, other flag bits 62 such as an invalid track format flag or bit, and an indication of whether or not data on a particular device, volume or track needs migration or has been migrated from the first to the second data storage system 14/16 respectively, as shown generally by flag or indicator bit 60.

Data map/table 24 may further include a physical address 64 entry for each element in the map or table 24, which identifies the beginning data address 64 at which the corresponding data element can be found on the disk drive 17a–17n of the new or second data storage system 16.

The present invention can improve the efficiency of the foregoing data migration by analyzing data requests that require a transfer from the first disk storage device 14 as a "donor storage device" to the second disk storage device 16 as a "target storage device". In essence a copy subroutine runs in a background mode to transfer data track by track in sequence from a starting location until all the data is migrated. If the host processor 12 issues a data transfer request (DTR), including either a read or write command, and the corresponding data is not located in the target storage device 16, a foreground mode is established that causes the copy subroutine to transfer the requested data. If a series of such data transfer requests establish a significant pattern of accesses to a localized area of the donor storage device 14, the parameters controlling the copy subroutine in the background mode are altered to shift the background copying to the localized area in which the statistically significant pattern of requests occurred.

Figure 3:
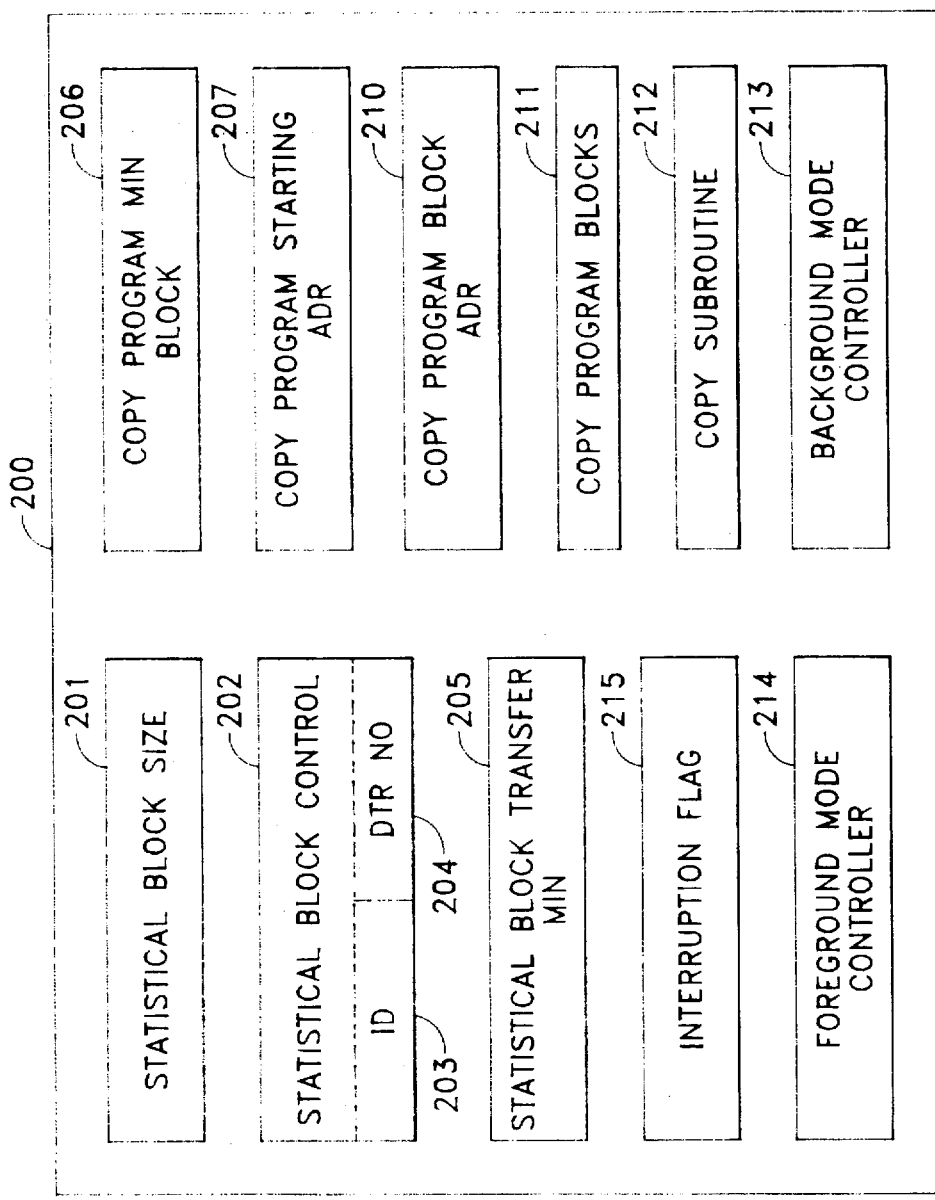
FIG. 3 depicts a set of registers that are useful in the implementation of this invention.

FIG. 3 depicts apparatus in the form of registers that implement this invention shown in a memory block 200; as will be apparent, the registers may be located at different locations within the data storage system 16 as part of the migrate process 27.

In the memory block 200 a STATISTICAL BLOCK SIZE register 201 records a number of consecutive blocks that will define a localized area. This is a fixed number that typically will be installed from the system configuration device 26 and that effectively partitions or divides the available storage locations into contiguous localized areas, each having a predetermined number of contiguous storage locations, typically physical tracks.

A STATISTICAL BLOCK CONTROL register 202 includes an identification (ID) field 203 and a DTR NO field 204. The ID field 203 contains the identification of the statistical block currently being evaluated; the DTR NO field 204 acts as a counter that alters each time a data transfer request (DTR) is made to that statistical block. A STATISTICAL BLOCK TRANSFER MIN register 205, also set to an initial value by the system configuration device 26, defines a user-generated minimum number of consecutive data transfer requests needed to initiate a copy program transfer. That is, register 205 establishes a threshold value that defines the boundary between random accesses that cause no change in the operation during the background mode and repeated access that produce the background mode operating change. This register 205 acts as a sensor that determines the existence of the significant pattern.

A COPY PROGRAM MIN BLOCK register 206 stores a minimum number of blocks, such as data tracks on a disk, that should be moved before any relocation of the copy program can occur. Specifically, the number in this register establishes a dead band or minimum delay that must expire before the copy program can be moved in response to a series of DTR requests to another area.

A COPY PROGRAM STARTING ADR register 207 acts as an initial address generator that stores the starting address for the copy program. Typically this would be initialized to a first track.

A COPY PROGRAM BLOCK ADR register 210 stores the current block address being transferred by the copy program. Typically this will be a track identification. In a sequential mode this register will be incremented or decremented to point to a successive address location after each transfer is complete.

A COPY PROGRAM BLOCKS register 211 counts the number of blocks that have been transferred after the COPY PROGRAM STARTING ADR register 207 is updated or initialized. This controls the relocation of the program. It is set to the value stored in the COPY PROGRAM MIN BLOCK register 206.

The remaining elements in the memory block 200 of FIG. 3 include a copy subroutine 212, a background mode controller 213, a foreground mode controller 214 and an interruption flag 215. As will now be described, the controllers 213 and 214 establish and control the areas from which the copy subroutine in block 211 transfers data from the donor storage device 14 to the target storage device 16. The interruption flag 215 controls that transfer between modes and, as will be described alters the parameters used by the copy subroutine.

Figure 4:
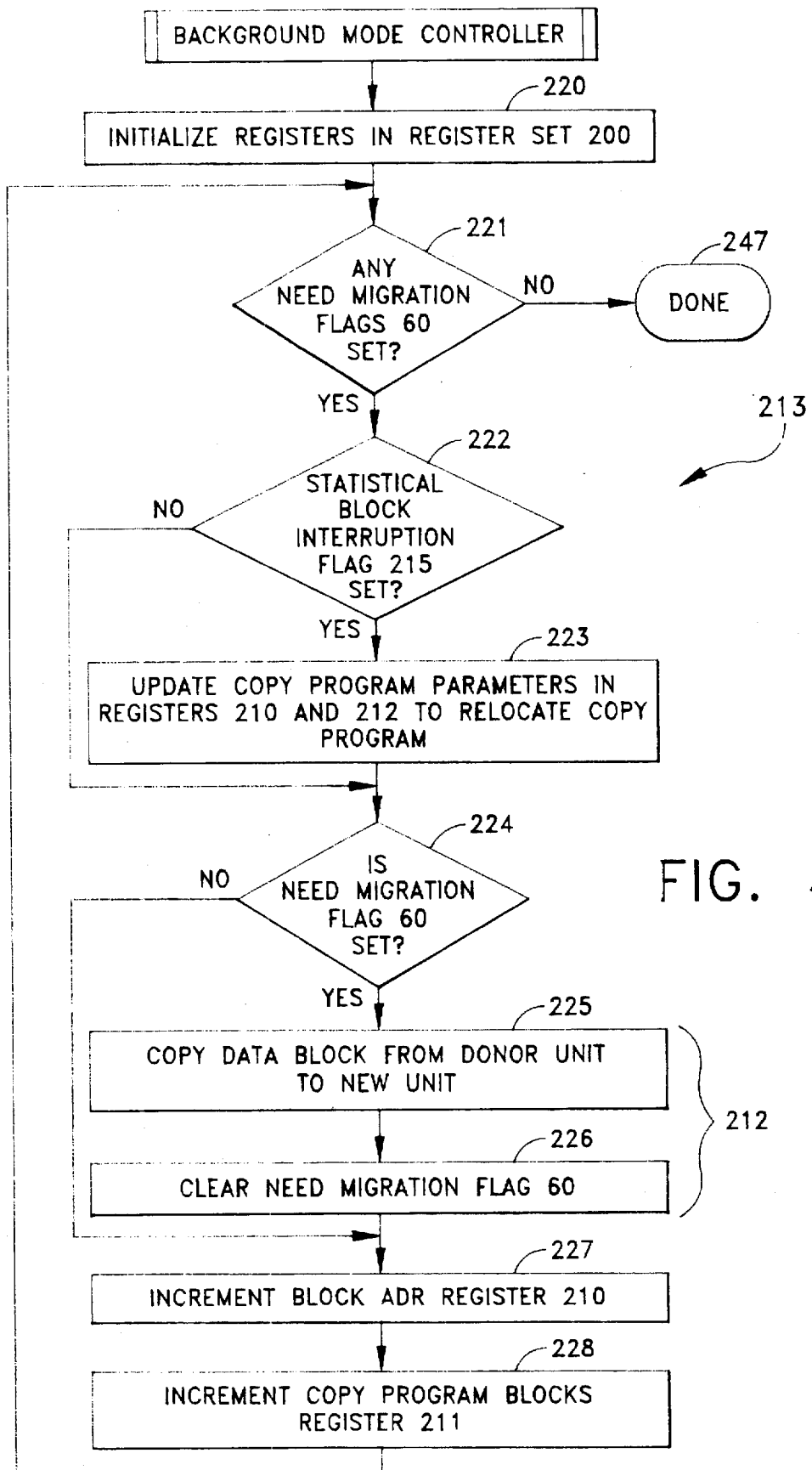
FIG. 4 is a flow chart of the steps for a copy block program operating in accordance with this invention.

FIG. 4 depicts the various steps by which the background mode controller 213 and the copy subroutine 212 interact to transfer data on a track-by-track basis. Registers in the register set 200 are set to initial values in step 220. Then the program enters a loop comprising the remaining steps in FIG. 4 until all the NEED MIGRATION flags 60 of FIG. 2 are set using step 221 as a loop control. As a first action in the loop, step 222 determines whether the STATISTICAL BLOCK INTERRUPTION flag 215 is set indicating that the copy subroutine 212 in FIG. 3 needs to be relocated. If that condition exists, control diverts to step 223 that updates the copy program parameters in registers 207 and 210 thereby to relocate the position of the copy subroutine to another track.

If the STATISTICAL BLOCK INTERRUPTION flag 206 is not set or after the copy program parameters are updated in step 223, step 224 determines whether the NEED MIGRATION flag 60 for the new track is set. If it is, step 225 acts as a module that copies the track, or other block of data elements, from the donor or first data storage device 14 to the target or second storage device 16. Step 226 acts as a module that clears the NEED MIGRATION flag 60 for the corresponding track position. Steps 225 and 226 form the copy subroutine 212. When the NEED MIGRATION flag 60 for a track is not set, the block has been previously transferred so control diverts from step 224 directly to step 227.

Step 227 acts as a module that increments the value in the COPY PROGRAM BLOCK ADR register 210 and step 228 increments the COPY PROGRAM BLOCKS register 211. Thus, the background mode controller 211 in FIG. 4 will, absent the setting of the STATISTICAL BLOCK INTERRUPTION flag 215, copy the tracks or data blocks from the donor storage device 14 to the target storage device 16 in an ordered sequence. Moreover the transfers are non-redundant because once a data block is transferred to the target storage device 16, all further DTR commands for a data element in that block are handled exclusively by the target storage device 16.

Figure 5:
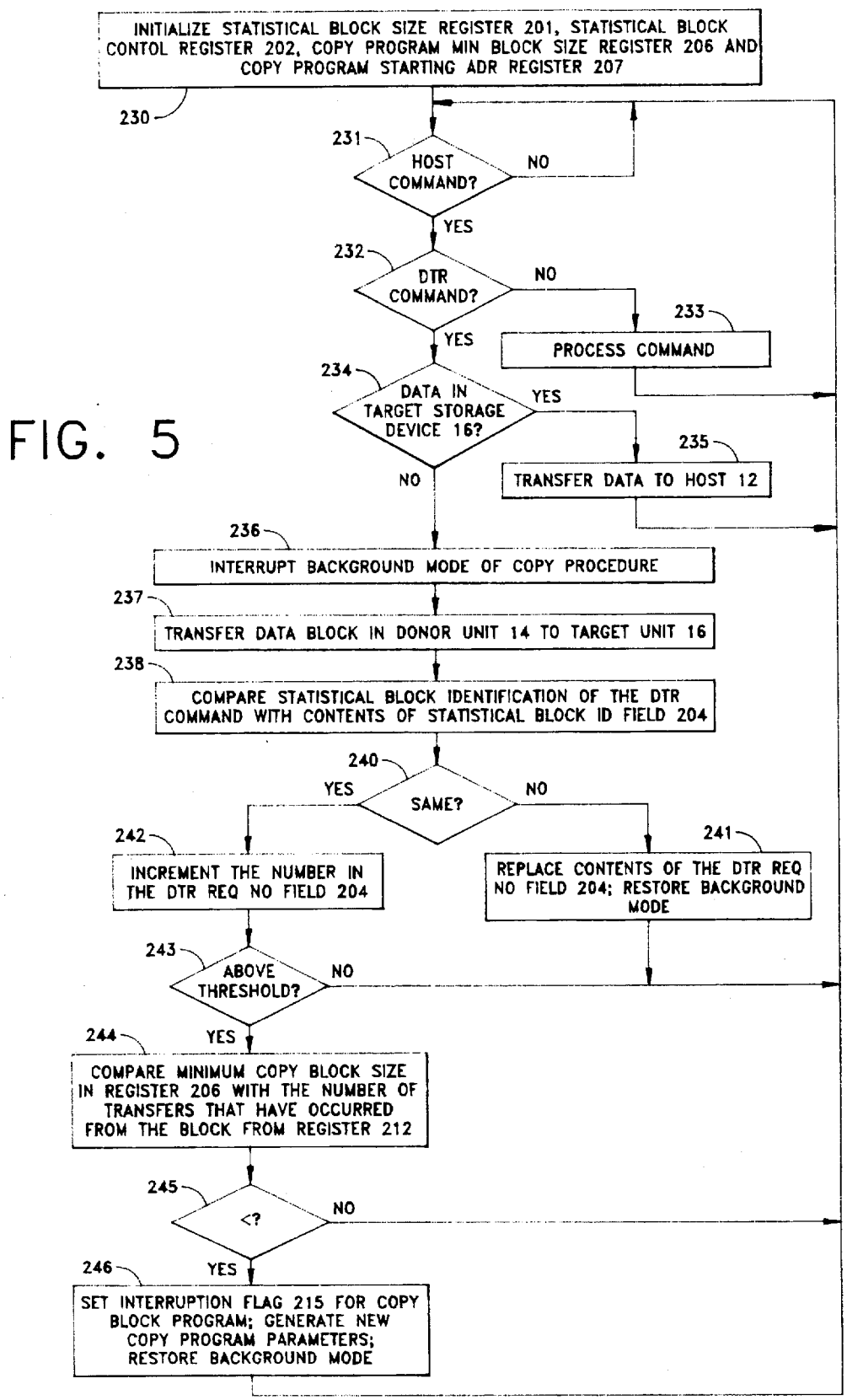
FIG. 5 is a flow chart of a program that controls an operating mode for the copy block program of FIG. 4.

FIG. 5 depicts the operation of the foreground mode controller 214 that controls the response to a DTR (data transfer request) command, makes any necessary transfer and determines whether the accesses define a significant pattern that warrants setting the STATISTICAL BLOCK INTERRUPTION flag 215. As part of an initialization procedure 230 in FIG. 5, the system will initialize (1) the statistical block size, (2) statistical block control ID and DTR NO values, (3) the copy program minimum block size and (4) the copy program starting position in the corresponding registers in block 200 of FIG. 3. Step 231 waits for a host command. When a host command is received, step 232 determines whether that command is a data transfer request (DTR) command. If not, step 232 branches to step 233 where the command is processed. Thereafter the system awaits the receipt of a next command at step 231.

Each time a DTR command is received, control branches from step 232 to step 234 to determine whether the target storage device 16 contains the requested data element. If it does, step 235 transfers the data element to the host computer in accordance with the DTR command. There is no requirement for any communication with the donor storage device 14. The response time then is the response time of the target storage device 16.

If the requested data element is not in the target storage device 16, migration is necessary. Step 236 acts as a sensor that interrupts the operation of the background mode controller 213 in FIG. 4 to transfer a track or other block containing the data element identified by the DTR command in step 237. In essence step 237 acts as a module that calls the copy subroutine 212 in FIG. 3 and supplies the arguments or parameters necessary to effect the transfer.

Next there is a determination of whether the access has established a significant pattern. In this particular embodiment, step 238 compares the statistical block identification associated with the DTR command with the ID field 203 in the STATISTICAL BLOCK CONTROL register 202. If the numbers are not the same, step 240 transfers control to step 241 acts as a module that replaces the contents of the ID field 203 with the corresponding statistical block identification for the DTR command and restores the operation of the background mode controller. Control then returns to await the next host command at step 231. Thus the foreground controller 214 follows control path through step 241 in response to random DTR accesses.

If the identification is the same as the identification in the field 203, step 240 branches to step 242. This branch represents an indication of localized access for this DTR command is to an area defined by the statistical block size in register 201 of FIG. 3. In step 242 the contents of the DTR NO field 204, that acts as a counter, are incremented. If the number in the field 204 is not above a threshold, step 243 diverts to loop back to await the next host command at step 231. If the number is above the threshold, indicating a significant pattern of accesses to a localized area, step 243 diverts to step 244 that compares the minimum copy block size in register 206 with the number of transfers that have occurred as obtained from register 211 that acts as a monitor for the number of background mode controller transfers. If the minimum block size has not been satisfied, step 245 diverts back to step 231 to wait for the next host command. Thus no relocation of the copy subroutine 212 will occur until the minimum number of transfers has been made from an existing localized area. Once that minimum is reached, step 245 diverts to step 246 that sets the interruption flag 215. Step 215 also generates new copy program parameters and then restores the background mode of the copy procedure. Thus steps 244 and 245 act as a module that allows the interruption flag 215 to be set only after a predetermined number of iterations of the copy subcounter have been performed.

When the interruption flag 215 is set and the background mode controller 213 in FIG. 4 enhances a next iteration, step 222 determines that the interruption flag 215 is set and diverts control to step 223 to update the copy subroutine parameters or arguments with the new copy program parameters generated in step 246 of FIG. 5. This will relocate the copy subroutine to the statistical block corresponding to the localized area accessed by the sequential DTR commands. That is, the copy subroutine begins to transfer blocks or tracks sequentially from that initial operation at a first block or track in the new statistical block or localized area that exhibits the significant access pattern and continues transfers from that localized area until at least the minimum number of blocks have been transferred. The sequential transfer then continues until the DTR commands establish a statistically significant pattern of accesses within another statistical block.

To summarize the operation of this invention, the copy subroutine 212, essentially comprising steps 225 and 226 in FIG. 3, operates in response to calls from the background mode controller 213 of FIG. 4 to move data on a track-by-track, or other data block-by-data block basis, from the donor storage device 14 to the target storage device 16. If an occasional or random access is requested by a DTR command, the foreground mode controller 214 in FIG. 5 interrupts the operation of the background mode controller 213 in FIG. 4 to transfer the track or data block containing the requested data element to the target storage device 16. Thereafter control passes back to continue the copy subroutine calls from the background mode controller according to the original sequence.

If, however, successive DTR commands access data blocks concentrated in a particular statistical block, the system predicts that further requests will be made to that statistical block. The foreground mode controller 214 in FIG. 5 then alters the arguments used by the background mode controller 213 in FIG. 4 to shift the operation of the background mode controller 213 to the statistical block receiving the repeated DTR requests. The minimum block size prevents another shift of that operation until such time as a minimum number of data blocks or tracks have been transferred. This process continues then until all the NEED MIGRATION FLAGS 60 have been cleared indicating that all the data has migrated. When this occurs, step 221 in FIG. 4 transfers control to a DONE procedure 247 that causes appropriate completion messages to be generated.

Figure 6:
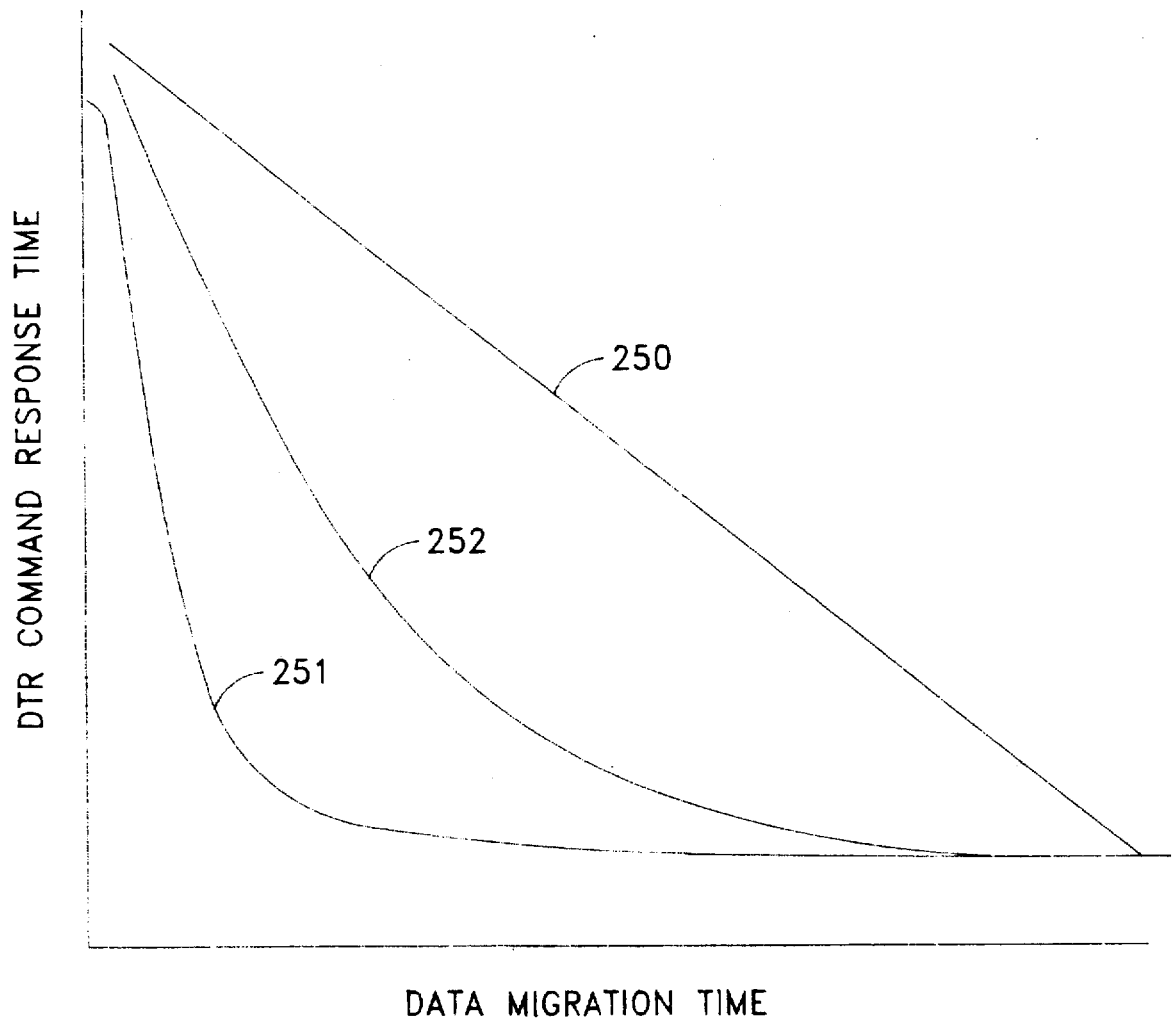
FIG. 6 graphically depicts the advantages of this invention.

FIG. 6 depicts, in graphical form, the comparison of host computer response time to DTR commands as a function of data migration time. Graph 250 represents a typical response scenario for random access requests. The graph indicates that initially there will be maximum response times and that these response times will decrease to normal response times in a substantially linear fashion as the migration continues. The maximum response time represents the time required to complete a transfer from the donor storage device 14. Essentially and intuitively, as more data migrates to the target storage device 16 the more likely it is that a DTR command will access data already in the target storage device 16 so the response time will be that of the target storage device 16.

Graph 251 depicts an optimal data migration response curve. It is assumed for this curve that it would be possible to predict with certainty the locations accessed by the pattern of DTR commands. Relevant data is transferred initially so that the response time drops rapidly to the minimum value.

In actual practice it is not always possible to make such a prediction. Graph 252 depicts a typically observed response time pattern realized with this invention. It has been found that this invention significantly reduces the response times as a function of data migration over the graph 250. In many cases the actual response time graph approach the optimal graph 251.

Consequently this invention meets the various stated objectives. It enables the efficient transfer of data from one storage device to another in concert with other external operations as represented by DTR commands. The transfers are particularly efficient in a data migration scenario where the data migration occurs in a transparent or parallel mode and provides a minimal impact on response times to DTR commands.

The invention has been described in terms of a specific embodiment particularly identifying registers, the methods of operating those registers and the various procedures. A number of alternatives are also useful. For example, the statistical block transfer minimum number could be loaded as an initial value to the DTR NO field 204 that could then be decremented rather than incremented to indicate the statistical significance of the DTR request when the value reached a zero value or a negative number. Likewise the COPY PROGRAM MIN BLOCK register 206 could receive the minimum number and be decremented. Still other modifications are well within the scope of persons of ordinary skill in the art. Therefore, it is the intent of the appended claims to cover all such variations and modifications as come within the true spirit and scope of this invention.

What is claimed as new and desired to be secured by Letters Patent of the United States is:

1. A method for transferring blocks of data elements from storage locations in a first data storage device to storage locations in a second data storage device wherein a host computer generates data transfer requests for data elements from arbitrary storage locations in the second data storage device, said method comprising the steps of:

A. defining a copy subroutine for effecting the transfer of data blocks in response to predetermined control parameters;

B. enabling a background mode controller to establish the predetermined control parameters for the copy subroutine;

C. enabling a foreground mode controller to make transfers of a data block in response to a data transfer request that accesses a data block located only in the first data storage device;

D. determining the existence of a significant pattern of accesses in response to data transfer requests from the host computer; and E. altering the predetermined control parameters for the background mode controller in response to the occurrence of the significant pattern.

2. A method as recited in claim 1 wherein the second data storage device includes a flag corresponding to each data block having a first value indicating that the corresponding data block is located only in the first data storage device and wherein one of the predetermined control parameters is the address of a data block location, said copy subroutine including the steps of:

i. moving a data block from the first to the second data storage device when the corresponding flag is at the first value; and ii. establishing a second value for the flag after the transfer is complete.

3. A method as recited in claim 1 wherein said copy subroutine includes the step of moving a data block from the first to the second data storage device.

4. A method as recited in claim 3 wherein said step of enabling a background mode controller includes the step of generating an initial address for a data block as an initial address parameter.

5. A method as recited in claim 4 wherein the second data storage device includes a flag corresponding to each data block having a first value indicating that the corresponding data block is located only in the first data storage device, said copy subroutine including the steps of:

i. altering the address parameter to identify a next data block in sequence if the corresponding flag has the first value; and ii. establishing a second value for the flag.

6. A method as recited in claim 2 wherein said foreground mode controller responds to the receipt of a data transfer request by:

i. interrupting the operation of the background mode controller;

ii. calling the copy subroutine to effect the transfer of a block containing the requested data element; and iii. restoring the background mode controller to its normal operation.

7. A method as recited in claim 6 wherein:

said step of determining the existence of a significant pattern includes the steps of:

i. dividing the available storage locations into contiguous localized areas wherein each localized area comprises a predetermined number of contiguous storage locations; and ii. counting successive data transfer requests that access a given localized area for a predetermined number of consecutive instances;

said altering of the predetermined control parameters includes the step of setting an interruption flag; and said background mode controller responds to the interruption flag by loading the address of the localized area.

8. A method as recited in claim 6 wherein said step of determining the existence of a significant pattern includes the steps of:

i. dividing the available storage locations into contiguous localized areas wherein each localized area comprises a predetermined number of contiguous storage locations; and ii. counting successive data transfer requests that access a given localized area for a predetermined number of consecutive instances;

said altering of the predetermined control parameters includes the steps of setting an interruption flag;

said background mode controller responds to the interruption flag by loading the address of the localized area; and said altering step additionally comprises:

i. monitoring the number of data transfers by the copy subroutine from a given set of predetermined control parameters; and ii. setting the interruption flag only after a predetermined number of iterations of the copy subroutine have been performed.

9. A method as recited in claim 8 wherein said background mode controller increments the number of accesses each time it calls the copy subroutine.

10. A method for transferring a data block of data elements from storage locations in a first data storage device to storage locations in a second data storage device by copying data blocks from sequential storage locations in a non-redundant fashion beginning from a defined starting storage location wherein data transfer requests for data elements that access arbitrary storage locations can occur during the sequential copying, said method comprising the steps of:

A. defining a copy subroutine for effecting the transfer of data blocks in response to predetermined control parameters, B. initializing the predetermined control parameters thereby to establish initial operations of the copy subroutine including the defined starting storage location, C. defining a plurality of localized areas, each localized area corresponding to a predetermined number of consecutive data elements; and D. thereafter and until all the data elements are copied to the second data storage device:

i. monitoring the data transfer requests for activity within a localized area constituting a significant activity; and ii. setting the control parameters including the starting storage location to a storage location in the localized area when said monitoring determines significant activity in a localized area thereby to enable the copy subroutine to make transfers at the localized area.

11. A method as recited in claim 10 wherein each of the first and second data storage devices comprises a disk array storage device and each data block is constituted by a single track on a disk array storage device, said definition of the copy subroutine including the step of effecting the transfer of an entire track during each operation of the copy subroutine.

12. A method as recited in claim 11 wherein said initializing of predetermined control parameters additionally includes the step of defining a need migration flag for each track having a first value indicating that the data in a corresponding track is located only on the first data storage device, said step of defining the copy subroutine additionally including the step of establishing a second value for the need migration flag corresponding to a track that has been transferred.

13. A method as recited in claim 12 wherein one of the control parameters is a track address, said step of initializing the predetermined control parameters including setting the track address to an initial value and beginning the copy subroutine at the corresponding track.

14. A method as recited in claim 13 wherein one of control parameters is a statistical block size and said step of defining the plurality of localized areas includes the step of defining contiguous blocks of tracks, each block containing a number of tracks corresponding to the statistical block size.

15. A method as recited in claim 14 wherein said step of setting the control parameters includes the enabling steps of:

i. counting each request for access to a localized area; and ii. comparing the number of consecutive requests for access to a single localized area to a predetermined threshold.

16. A method as recited in claim 15 wherein each localized area is identified by a starting address and said step of setting the control parameters upon detecting significant activity includes setting the address parameter for the copy subroutine to the starting address of the localized area in which the significant activity has occurred.

17. A method as recited in claim 16 wherein one of the control parameters is represents a minimum number of tracks to be copied and said enabling step includes the additional step of comparing the number of tracks that have been transferred from a localized area.

18. Apparatus for transferring blocks of data elements from storage locations in a first data storage device to storage locations in a second data storage device wherein a host computer generates data transfer requests for data elements from arbitrary storage locations in the second data storage device, said apparatus comprising:

A. a copy subroutine for effecting the transfer of data blocks in response to predetermined control parameters;

B. a background mode controller for establishing the predetermined control parameters for the copy subroutine;

C. foreground mode controller for transferring a data block in response to a data transfer request that accesses a data block located only in the first data storage device;

D. means for determining the existence of a significant pattern of accesses in response to data transfer requests from the host computer; and E. means for altering the predetermined control parameters for said background mode controller in response to the occurrence of the significant pattern.

19. Apparatus as recited in claim 18 wherein the second data storage device includes a flag corresponding to each data block having a first value indicating that the corresponding data block is located only in the first data storage device and wherein one of the predetermined control parameters is the address of a data block location, said copy subroutine including:

i. means for moving a data block from the first to the second data storage device when the corresponding flag is at the first value; and ii. means for establishing a second value for the flag after the transfer is complete.

20. Apparatus as recited in claim 18 wherein said copy subroutine includes means for moving a data block from the first to the second data storage device.

21. Apparatus as recited in claim 20 wherein said background mode controller includes means for generating an initial address for a data block as an initial address parameter.

22. Apparatus as recited in claim 21 wherein the second data storage device includes a flag corresponding to each data block having a first value indicating that the corresponding data block is located only in the first data storage device, said copy subroutine including:

i. means for altering the address parameter to identify a next data block in sequence if the corresponding flag has the first value; and ii. means for establishing a second value for the flag after the data block is transferred.

23. Apparatus as recited in claim 19 wherein said foreground mode controller includes:

i. means for interrupting the operation of the background mode controller in response to the receipt of a data transfer request;

ii. means for operating said copy subroutine to effect the transfer of a block containing the requested data element; and iii. means for restoring said background mode controller to its normal operation.

24. Apparatus as recited in claim 23 wherein said means for determining the existence of a significant pattern includes:

i. means for dividing the available storage locations into contiguous localized areas wherein each localized area comprises a predetermined number of contiguous storage locations; and ii. means for counting successive data transfer requests that access a given localized area for a predetermined number of consecutive instances;

said altering means includes means for setting an interruption flag; and said background mode controller includes means responsive to the interruption flag for loading the address of the localized area.

25. Apparatus as recited in claim 23 wherein said means for determining the existence of a significant pattern includes:

i. means for dividing the available storage locations into contiguous localized areas wherein each localized area comprises a predetermined number of contiguous storage locations; and ii. means for counting successive data transfer requests that access a given localized area for a predetermined number of consecutive instances;

said background mode controller includes means responsive to the interruption flag for loading the address of the localized area; and said altering means comprises:

i. means for setting an interruption flag;

ii. monitoring the number of data transfers by the copy subroutine from a given set of predetermined control parameters; and iii. setting the interruption flag only after a predetermined number of iterations of the copy subroutine have been performed.

26. Apparatus as recited in claim 25 wherein said background mode controller includes means incrementing the number of accesses each time it calls the copy subroutine.

27. Apparatus for transferring a data block of data elements from storage locations in a first data storage device to storage locations in a second data storage device by copying data blocks from sequential storage locations in a non-redundant fashion beginning from a defined starting storage location wherein data transfer requests for data elements the access arbitrary storage locations can occur during the sequential copying, said apparatus comprising:

A. a copy subroutine for effecting the transfer of data blocks in response to predetermined control parameters, B. means for initializing the predetermined control parameters thereby to establish initial operations of the copy subroutine including the defined starting storage location, C. means for defining a plurality of localized areas, each localized area corresponding to a predetermined number of consecutive data elements; and D. means thereafter and until all the data elements are copied to the second data storage device for effecting a data transfer including:

i. means for monitoring the data transfer requests for activity within a localized area constituting a significant activity; and ii. means for setting the control parameters including the starting storage location to a storage location in the localized area when said monitoring means determines significant activity in a localized area thereby to enable the copy subroutine to make transfers at the localized area.

28. Apparatus as recited in claim 27 wherein each of the first and second data storage devices comprises a disk array storage device and each data block is constituted by a single track on a disk array storage device, said copy subroutine including means for effecting the transfer of an entire track during each operation of said copy subroutine.

29. Apparatus as recited in claim 28 additionally including a need migration flag for each track having a first value indicating that the data in a corresponding track is located only on the first data storage device, said copy subroutine including means for establishing a second value for the need migration flag corresponding to a track that has been transferred.

30. Apparatus as recited in claim 29 wherein one of the control parameters is a track address, said initializing means setting the track address to an initial value to begin said copy subroutine at the corresponding track.

31. Apparatus as recited in claim 30 wherein one of control parameters is a statistical block size and said defining means includes means for defining contiguous blocks of tracks, each block containing a number of tracks corresponding to the statistical block size.

32. Apparatus as recited in claim 31 wherein said setting means includes:

i. means for counting each request for access to a localized area; and ii. means for comparing the number of consecutive requests for access to a single localized area to a predetermined threshold.

33. Apparatus as recited in claim 32 wherein each localized area is identified by a starting address and said setting means includes means for setting the address parameter for said copy subroutine to the starting address of the localized area in which the significant activity has occurred.

34. Apparatus as recited in claim 33 wherein one of the control parameters is represents a minimum number of tracks to be copied and said enabling means includes means for comparing the number of tracks that have been transferred from a localized area.

* * * * *